United States Patent
Hatakeyama et al.

(10) Patent No.: US 9,911,183 B2
(45) Date of Patent: Mar. 6, 2018

(54) IMAGE PROCESSING METHOD, IMAGE PROCESSING APPARATUS, IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventors: Koshi Hatakeyama, Tokyo (JP); Norihito Hiasa, Utsunomiya (JP); Kaoru Eguchi, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 76 days.

(21) Appl. No.: 14/809,890

(22) Filed: Jul. 27, 2015

(65) Prior Publication Data
US 2016/0037096 A1 Feb. 4, 2016

(30) Foreign Application Priority Data
Aug. 1, 2014 (JP) .................................. 2014-157545

(51) Int. Cl.
*G06T 5/20* (2006.01)
*H04N 5/357* (2011.01)
(Continued)

(52) U.S. Cl.
CPC ................ *G06T 5/20* (2013.01); *G06T 5/003* (2013.01); *H04N 5/23296* (2013.01);
(Continued)

(58) Field of Classification Search
CPC .... H04N 5/3572; H04N 5/23296; G06T 5/20; G06T 5/003
See application file for complete search history.

(56) References Cited

U.S. PATENT DOCUMENTS 8,542,290 B2  9/2013  Ogasahara
9,025,038 B2  5/2015  Tsutsumi
(Continued)

FOREIGN PATENT DOCUMENTS

CN  103098457 A  5/2013
CN  103167239 A  6/2013
(Continued)

OTHER PUBLICATIONS

Ng et al., "Light Field Photography with a Hand-held Plenoptic Camera", pp. 1-11, Stanford Tech Report CTSR Feb. 2005.
(Continued)

*Primary Examiner* — Christopher K Peterson
(74) *Attorney, Agent, or Firm* — Rossi, Kimms & McDowell LLP

(57) ABSTRACT

An image processing method includes the steps of acquiring a first image shot by using a compound eye image pickup apparatus, acquiring image capturing condition information of the first image, acquiring, depending on the image capturing condition information, optical characteristic information of a plurality of optical systems having a plurality of focal lengths different from each other in the compound eye image pickup apparatus, correcting a deterioration of the first image caused by shooting the first image based on the optical characteristic information, and generating a second image based on information of a position and an angle of a ray obtained from the first image whose deterioration is corrected, and the optical characteristic information contains at least one of information related to aberrations and information related to peripheral illumination of the optical systems.

16 Claims, 10 Drawing Sheets

(51) Int. Cl.
*H04N 5/232* (2006.01)
*G06T 5/00* (2006.01)
(52) U.S. Cl.
CPC . *H04N 5/3572* (2013.01); *G06T 2207/10016* (2013.01); *G06T 2207/10024* (2013.01); *G06T 2207/10052* (2013.01)

(56) References Cited

U.S. PATENT DOCUMENTS

| | | |
|---|---|---|
| 2011/0216215 A1* | 9/2011 | Maruyama ............ G06T 7/0018 348/222.1 |
| 2013/0093842 A1* | 4/2013 | Yahata ............... H04N 5/23238 348/38 |
| 2013/0223759 A1 | 8/2013 | Nishiyama |
| 2014/0028869 A1 | 1/2014 | Hatakeyama |

FOREIGN PATENT DOCUMENTS

| | | |
|---|---|---|
| CN | 103327237 B | 8/2016 |
| JP | 09005643 A | 1/1997 |
| JP | 2005303694 A | 10/2005 |
| JP | 2011135359 A | 7/2011 |
| JP | 2013062587 A | 4/2013 |
| JP | 2013062626 A | 4/2013 |
| JP | 2013211827 A | 10/2013 |

OTHER PUBLICATIONS

Office Action issued in Chinese Appln. No. 201510455204.9 dated Dec. 5, 2017. English translation provided.

\* cited by examiner

IMAGE PROCESSING METHOD, IMAGE PROCESSING APPARATUS, IMAGE PICKUP APPARATUS, AND NON-TRANSITORY COMPUTER-READABLE STORAGE MEDIUM

BACKGROUND OF THE INVENTION

Field of the Invention

The present invention relates to an image processing method of a parallax image.

Description of the Related Art

An image pickup apparatus such as a video camera and a digital camera requires having a thin shape and a high zoom ratio. In a conventional typical image pickup system, an optical system is configured by combining a plurality of optical lenses to suppress generation of an aberration of the optical system and also to satisfy a desired optical performance. In order to reduce in size of this optical system, reduction in image size and reduction in diameter of the optical system are considered. However, it is difficult to reduce the image size while the resolution is maintained.

On the other hand, a compound eye image pickup apparatus (compound eye image pickup apparatus) which divides an optical system into a plurality of optical systems to achieve small-size optical systems has been proposed. The term "compound eye" means a configuration using a structure of an eye of an insect, and for example a configuration in which the optical system is constituted by a lens array including a plurality of lens units and each lens unit is reduced in size and reduced in focal length to miniaturize the optical system is known. However, in the conventional compound eye image pickup apparatus, it is difficult to add an optical zoom function to make a shooting angle of view variable. This is because the optical zoom function which makes the shooting angle of view variable by using a method of moving a position of a lens constituting the optical system needs a mechanical moving mechanism and accordingly the image pickup system is increased in size.

Japanese Patent Laid-open No. 2005-303694 discloses a configuration in which a lens unit with a short focus and a lens unit with a long focus which have angles of view different from each other are disposed to capture an image to include the same part of an object. In other words, a zoom-up image obtained by an image pickup element corresponding to the long focus lens is fitted into part of a wide image obtained by an image pickup element corresponding to the short focus lens. Accordingly, an image which has a high resolution for part of an area of the image and has a low resolution and a wide angle of view for the other area of the image can be obtained. This is effective for a surveillance camera, and for example a suspicious figure at a center area or the like can be zoomed up to be monitored in detail while understanding an entire area of a monitoring area.

Japanese Patent Laid-open No. 2011-135359 discloses a compound eye image pickup system which is configured by a plurality of sub-camera modules in which color filters different from each other are disposed. In addition, Japanese Patent Laid-open No. 2011-135359 discloses a method of performing restoration processing on an image for each color component to correct an aberration of an optical system which easily occurs as the image pickup system is thinned.

The compound eye image pickup apparatus is capable of acquiring the "Light Field" by disposing image pickup systems in an array to obtain parallax images. The "Light Field" means information of a position and an angle of a ray from an object taken into the image pickup apparatus. In detail, the "Light Field" is described in "Ren.Ng, etc., 'Light Field Photography with a Hand-held Plenoptic Camera', Stanford Tech Report CTSR 2005-2". A plurality of configurations of image pickup apparatus which are capable of acquiring the "Light Field" are known, and the compound eye image pickup apparatus is one of them. The "Light Field" obtained as an image on an image pickup element is a parallax image or an image corresponding to a pupil of an optical system according to the configuration of the image pickup apparatus, and it is the same in that the ray passing through the pupil of the optical system is separated into the position and the angle to be obtained. That is, the parallax image and the image corresponding to the pupil of the optical system can be treated to be approximately equivalent by rearranging information of each pixel. When the "Light Field" is acquired and the image is reconstructed by image processing, focusing and depth adjustment within a predetermined range can be performed after shooting (i.e., capturing) the image. Such a function is beneficial to a thin compound eye image pickup apparatus to reduce drive units.

However, in the configuration of Japanese Patent Laid-open No. 2005-303694, optical axes of the optical systems with focal lengths different from each other are displaced from each other. Therefore, it is not appropriate for performing continuous zooming in which viewpoints are constant from a wide-angle side to a telephoto side similarly to a typical monocular zoom optical system. Furthermore, in this configuration, "Light Field" cannot be acquired.

In an actual shooting lens, not a little aberration exists. A spread of light beams at a point which is conjugate to one point in an object space is called a point spread function (PSF). A color bleeding, such as an axial chromatic aberration, a spherical aberration of a color, and a coma aberration of the color, in a color image, and a color shift in a lateral direction, that is, a chromatic aberration of magnification can correspond to a difference in position or shape of the PSF for each wavelength. When an aberration occurs in each optical system in the compound eye image pickup apparatus, a reconstructed image is deteriorated because an image formed via each optical system is deteriorated. The method disclosed in Japanese Patent Laid-open No. 2011-135359 performs the restoration processing on an image formed via each of the optical systems in which color filters different from each other are disposed. However, since a plurality of optical systems with the same focal length are disposed, zooming cannot be performed. Furthermore, the color filters are different from each other although the plurality of optical systems with the same focal length are disposed, and accordingly the "Light Field" cannot be acquired.

SUMMARY OF THE INVENTION

The present invention provides an image processing method capable of generating a high-definition image from a shot image obtained via a plurality of optical systems having a plurality of focal lengths different from each other, an image processing apparatus, an image pickup apparatus, and a non-transitory computer-readable storage medium.

An image processing method as one aspect of the present invention includes the steps of acquiring a first image shot by using a compound eye image pickup apparatus, acquiring image capturing condition information of the first image, acquiring, depending on the image capturing condition information, optical characteristic information of a plurality of optical systems having a plurality of focal lengths different from each other in the compound eye image pickup apparatus, correcting a deterioration of the first image caused by shooting the first image based on the optical characteristic information, and generating a second image based on information of a position and an angle of a ray obtained from the first image whose deterioration is corrected, and the optical characteristic information contains at least one of information related to aberrations and information related to peripheral illumination of the optical systems.

An image processing apparatus as another aspect of the present invention includes an image acquisition unit configured to acquire a first image shot by using a compound eye image pickup apparatus, an image capturing condition acquisition unit configured to acquire image capturing condition information of the first image, an optical characteristic acquisition unit configured to acquire, depending on the image capturing condition information, optical characteristic information of a plurality of optical systems having a plurality of focal lengths different from each other in the compound eye image pickup apparatus, a correction unit configured to correct a deterioration of the first image caused by shooting the first image based on the optical characteristic information, and an image processing unit configured to generate a second image based on information of a position and an angle of a ray obtained from the first image whose deterioration is corrected, and the optical characteristic information contains at least one of information related to aberrations and information related to peripheral illumination of the optical systems.

An image pickup apparatus as another aspect of the present invention includes a plurality of optical systems having a plurality of focal lengths different from each other, a plurality of image pickup elements provided corresponding to the respective optical systems, an image acquisition unit configured to acquire a first image shot by using the optical systems and the image pickup elements, an image capturing condition acquisition unit configured to acquire image capturing condition information of the first image, an optical characteristic acquisition unit configured to acquire, depending on the image capturing condition information, optical characteristic information of the optical systems, a correction unit configured to correct a deterioration of the first image caused by shooting the first image based on the optical characteristic information, and an image processing unit configured to generate a second image based on information of a position and an angle of a ray obtained from the first image whose deterioration is corrected, and the optical characteristic information contains at least one of information related to aberrations and information related to peripheral illumination of the optical systems.

A non-transitory computer-readable storage medium as another aspect of the present invention stores an image processing program which causes a computer to execute a process including the steps of acquiring a first image shot by using a compound eye image pickup apparatus, acquiring image capturing condition information of the first image, acquiring, depending on the image capturing condition information, optical characteristic information of a plurality of optical systems having a plurality of focal lengths different from each other in the compound eye image pickup apparatus, correcting a deterioration of the first image caused by shooting the first image based on the optical characteristic information, and generating a second image based on information of a position and an angle of a ray obtained from the first image whose deterioration is corrected, and the optical characteristic information contains at least one of information related to aberrations and information related to peripheral illumination of the optical systems.

Further features and aspects of the present invention will become apparent from the following description of exemplary embodiments with reference to the attached drawings.

DESCRIPTION OF THE EMBODIMENTS

Figure 1:
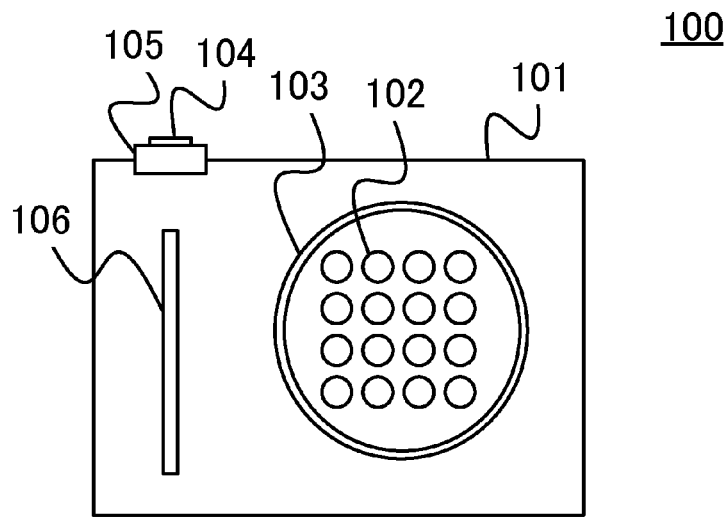
FIG. 1 is a schematic diagram of an image pickup apparatus in Embodiment 1.

Exemplary embodiments of the present invention will be described below with reference to the accompanied drawings.

First of all, the definitions of terms and image restoration processing (image processing method) which are used in this embodiment will be described. The image processing method described in this embodiment is used as appropriate in each embodiment described below.

(Input Image)

An input image is a digital image (a shot image) obtained by receiving light with an image pickup element via an image pickup optical system, and is deteriorated by an optical transfer function (OTF) depending on the image pickup optical system and various optical filters. In addition, distortion of an image caused by a distortion aberration and a color shift of an image caused by a chromatic aberration of magnification occur. The distortion aberration and the chromatic aberration of magnification can be contained in the optical transfer function, but in this embodiment they are described separately considering a case in which correction processing for them is performed independently. Furthermore, a reduction of a peripheral illumination in which a light amount is reduced toward a periphery of an image occurs. The image pickup optical system can use not only a lens, but also a mirror (a reflection surface) having a curvature.

The output image has, for example, information on an RGB color component as a color component. In addition to the RGB color component, a color space which is typically used, such as lightness, hue, and chroma which are expressed by LCH, luminance expressed by YCbCr, and color-difference signal, can be selected as the color component. As alternative types of color spaces, XYZ, Lab, Yuv, and JCh can also be used. Furthermore, a color temperature may be used.

The input image or an output image can be accompanied by an image capturing condition (image capturing condition information) such as a focal length of a lens, an aperture value, and a shooting distance, and various pieces of correction information used to correct the image. When correction processing is performed on an image which is transmitted from an image pickup apparatus to an image processing apparatus, it is preferred that the image is accompanied by the image capturing condition or correction information as described above.

(Optical Transfer Function (OTF))

An optical transfer function (OTF) obtained by the Fourier transform of a point spread function (PSF) is frequency component information on an aberration and is represented by a complex number. An absolute value of the OTF, that is, an amplitude component, is referred to as an MTF (Modulation Transfer Function), and a phase component is referred to as a PTF (Phase Transfer Function). Accordingly, the MTF and the PTF are frequency characteristics of the amplitude component and the phase component of an image deterioration caused by the aberration. The phase component PTF is represented by the following expression (1) as a phase angle. In expression (1), symbols Re(OTF) and Im(OTF) represent a real part and an imaginary part of the OTF, respectively.

$$PTF = \tan^{-1}(Im(OTF)/Re(OTF)) \quad (1)$$

As described above, because the optical transfer function (OTF) of the image pickup optical system deteriorates the amplitude component and the phase component of an image, with respect to an image at an imaging position, each point of an object is asymmetrically blurred as seen in the case of a coma aberration.

(Image Restoration Processing)

A method of correcting a deterioration of the amplitude component (MTF) and a deterioration of the phase component (PTF) of the optical transfer function (OTF) by using information of the optical transfer function (OTF) of the image pickup optical system is known. This method is called an image restoration or image recovery, and hereinafter, processing to correct the deterioration of the image by using the information of the optical transfer function (OTF) of the image pickup optical system is referred to as image restoration processing or restoration processing.

Hereinafter, an outline of the image restoration processing will be described. The following expression (2) is satisfied where g(x,y) is a deteriorated image, f(x,y) is an original image, and h(x,y) is a point spread function (PSF) which is a Fourier pair of the optical transfer function (OTF). In expression (2), symbol * denotes a convolution (convolution integration, or convolution sum-product), and symbol (x,y) denotes a coordinate on the image.

$$g(x,y) = h(x,y) * f(x,y) \quad (2)$$

Performing the Fourier transform for expression (2) to convert it into a display format on a frequency surface, a product format for each frequency is obtained as represented by the following expression (3). In expression (3), H is the optical transfer function OTF obtained by the Fourier transform of the point spread function PSF (h), G and F are values obtained by the Fourier transform of the deteriorated image g and the original image f, respectively, and (u,v) is a coordinate on a two-dimensional frequency surface, that is, a frequency.

$$G(u,v) = H(u,v) \cdot F(u,v) \quad (3)$$

In order to obtain the original image f from the deteriorated shot image, both sides of Expression (3) are divided by the optical transfer function H, as represented by the following expression (4).

$$G(u,v)/H(u,v) = F(u,v) \quad (4)$$

In expression (4), when the inverse Fourier transform is performed for F(u,v), that is, G(u,v)/H(u,v) to reconvert the frequency surface to a real surface, the original image f(x,y) can be obtained as a restored image.

Performing convolution processing on the image on the real surface, similarly, the original image f(x,y) can be obtained as represented by the following expression (5) where R is a value obtained by the inverse Fourier transform of $H^{-1}$.

$$g(x,y) * R(x,y) = f(x,y) \quad (5)$$

In Expression (5), R (x,y) is called an image restoration filter. When the image is a two-dimensional image, typically, this image restoration filter is also a two-dimensional filter which has a tap (cell) corresponding to each pixel of the image. The number of taps (number of cells) of the image restoration filter is set to the number of taps depending on required image quality, image processing capability, aberration characteristics, and the like. Since this image restoration filter needs to reflect at least the aberration characteristics, it is different from a conventional edge-enhanced filter (a high-pass filter) or the like. Since the image restoration filter is determined based on the optical transfer function (OTF), both of the deteriorations of the amplitude component (MTF) and the phase component (PTF) can be corrected with high accuracy.

Since an actual image contains a noise component, the use of the image restoration filter created by a perfect inverse of the optical transfer function (OTF) as described above results in a significant amplification of the noise component along with the restoration of the deteriorated image. This is because the MTF (amplitude component) of the optical system is boosted such that its value returns to one over all frequencies from a state in which a noise amplitude is added to the amplitude component of the image. The value of the MTF, which is an amplitude deterioration caused by the optical system, returns to one, but the power spectral of the noise is boosted at the same time, and as a result the noise is amplified depending on the degree of boosting of the MTF (i.e., depending on a restoration gain). Thus, if the image contains a noise, a satisfactory image as an image to be appreciated cannot be obtained. This is represented by the following expression (6-1) or (6-2). In expressions (6-1) and (6-2), N is a noise component.

$$G(u,v)=H(u,v) \cdot F(u,v)+N(u,v) \quad (6\text{-}1)$$

$$G(u,v)/H(u,v)=F(u,v)+N(u,v)/H(u,v) \quad (6\text{-}2)$$

In this respect, a method of controlling the degree of the restoration depending on the strength ratio SNR (signal-to-noise ratio) of an image signal and a noise signal, as in the case of the Wiener filter represented by the following expression (7), is known.

$$M(u, v) = \frac{1}{H(u, v)} \frac{|H(u, v)|^2}{|H(u, v)|^2 + SNR^2} \quad (7)$$

In Expression (7), M(u,v) is frequency characteristics of the Wiener filter, and |H(u, v)| is an absolute value (MTF) of the optical transfer function (OTF). This method suppresses the restoration gain (degree of restoration) with decrease of the MTF, and it enhances the restoration gain with increase of the MTF for each frequency. Typically, an MTF of the image pickup optical system has higher values in low frequencies and lower values in high frequencies, and accordingly the method is a method of substantially suppressing the restoration gain in the high frequencies of the image.

Figure 2:
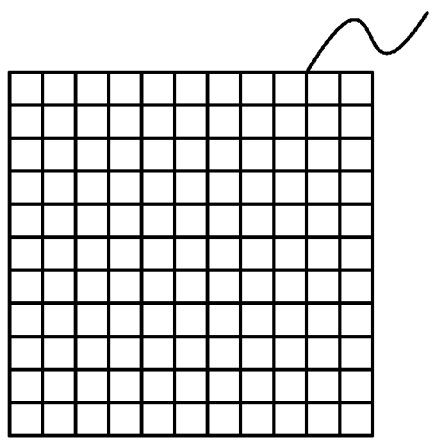
FIG. 2 is an explanatory diagram of an image restoration filter in each embodiment.
Figure 3:
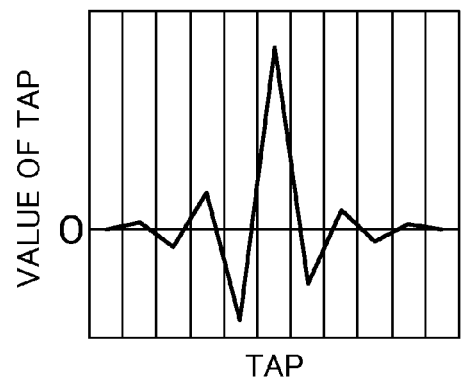
FIG. 3 is an explanatory diagram of the image restoration filter in each embodiment.

Subsequently, referring to FIGS. 2 and 3, the image restoration filter will be described. FIGS. 2 and 3 are explanatory diagrams of the image restoration filter which is used for the image processing method in this embodiment. The number of taps in the image restoration filter is determined depending on aberration characteristics of the image pickup optical system and on a required restoration accuracy. The image restoration filter illustrated in FIG. 2 as an example is a two-dimensional filter having an 11×11 taps. In FIG. 2, while a value (coefficient) in each tap is omitted, one cross section of the image restoration filter is illustrated in FIG. 3. A value (coefficient value) of each tap in the image restoration filter serves as restoring, to an original point, a signal value (PSF) spatially spread due to the aberration. That is, performing convolution processing (convolution integration, or convolution sum-product) of the image restoration filter on an image, an image in which the aberration is corrected can be obtained.

Figure 4A:
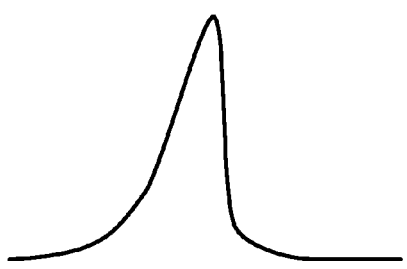
FIGS. 4A and 4B are explanatory diagrams of correction state of a point image in each embodiment.
Figure 4B:
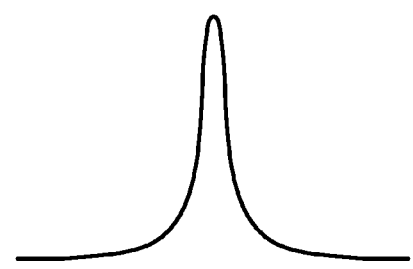
Figure 5A:
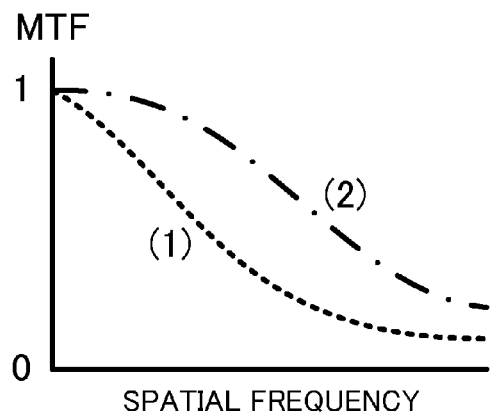
FIGS. 5A and 5B are explanatory diagrams of an amplitude component and a phase component in each embodiment.
Figure 5B:
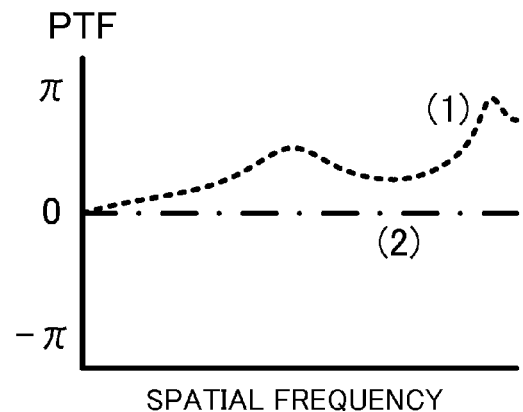

Subsequently, referring to FIGS. 4A, 4B, 5A, and 5B, characteristics of the image restoration in a real space and a frequency space will be described. FIGS. 4A and 4B are explanatory diagrams of a correction state of a point image in this embodiment, and FIGS. 4A and 4B illustrate the PSFs before and after the restoration, respectively. FIGS. 5A and 5B are explanatory diagrams of the amplitude component and the phase component in this embodiment, respectively. In FIG. 5A, a dotted line (1) denotes the MTF before the restoration, and a dashed-dotted line (2) denotes the MTF after the restoration. Similarly, in FIG. 5B, a dotted line (1) denotes the PTF before the restoration, and a dashed-dotted line (2) denotes the PTF after the restoration. The PSF before the restoration is asymmetrically spread, and because of this asymmetry, the PTF has a value nonlinear with respect to the frequency. The restoration processing corrects the MTF to be amplified and also corrects the PTF to be zero, and accordingly the restored PSF is symmetric and sharp-shaped.

With respect to a method of creating the image restoration filter, the image restoration filter can be obtained by the inverse Fourier transform of a function designed based on an inverse function of the optical transfer function (OTF) of the image pickup optical system. The image restoration filter used in this embodiment can be changed as appropriate, and the Wiener filter described above, for example, can be used. When the Wiener filter is used, the inverse Fourier transform of M(u,v) represented by expression (7) allows creation of the image restoration filter in a real space which is actually convolved with an image.

The optical transfer function (OTF) varies depending on an image height of the image pickup optical system (i.e., depending on a position in an image) even in one shooting state. Therefore, it is preferred that the image restoration filter changes to be used depending on the image height. The outline of the image restoration processing is as described above.

As image correction processing by using other optical characteristics, distortion correction processing is processing to correct an image based on distortion information at an imaging position depending on the image height. Chromatic aberration of magnification correction processing is processing to correct an image based on shift information at the imaging position for each color component (for example, RGB) depending the image height. A peripheral illumination correction processing is processing to correct an image based on light amount information depending on the image height.

Embodiment 1

Next, an image pickup apparatus in Embodiment 1 of the present invention will be described. FIG. 1 is a schematic diagram of an image pickup apparatus 100 (camera as a compound eye image pickup apparatus) in this embodiment. In FIG. 1, reference numeral 101 denotes a camera body (image pickup apparatus body), reference numeral 102 denotes a lens unit (shooting lens unit), reference numeral 103 denotes a lens holder (shooting lens holder), reference numeral 104 denotes a shutter button, reference numeral 105 denotes a zoom lever, and reference numeral 106 denotes a grip. The lens unit 102 includes a plurality of optical systems (image pickup optical systems). In this embodiment, the lens unit 102 includes 16 optical systems of 4×4 vertically and horizontally, but it is not limited thereto. In this embodiment, the image pickup apparatus 100 includes the lens unit 102 and the camera body 101 integrated with each other, but it is not limited thereto. This embodiment can also be applied to a configuration in which the lens unit 102 (lens apparatus) is removably mounted on the camera body 101.

Figure 6:
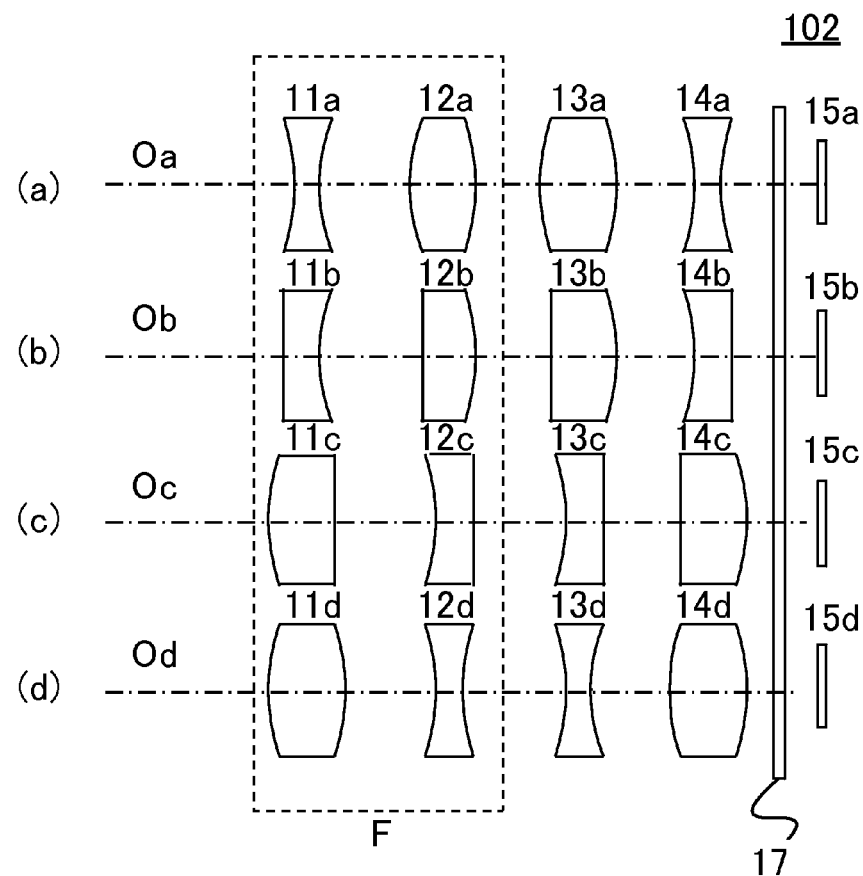
FIG. 6 is an explanatory diagram of a lens unit (a plurality of optical systems) in Embodiment 1.
Figure 7:
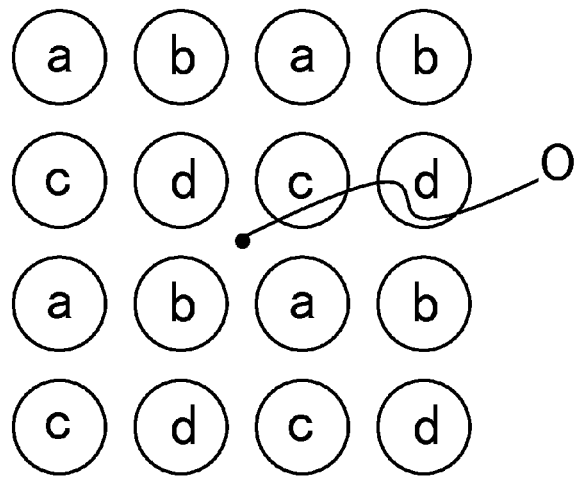
FIG. 7 is a diagram of an arrangement of the plurality of optical systems in Embodiment 1.

Subsequently, referring to FIG. 6, a structure of the plurality of optical systems in this embodiment will be described. FIG. 6 is an explanatory diagram of the plurality of optical systems (lens unit 102). The lens unit 102 of this embodiment is constituted by four groups, each of which includes four optical systems (a) to (d) having four focal lengths different from each other, that is, the lens unit 102 includes a total of 16 optical systems.

The optical system (a) includes, in order from an object side (left side in FIG. 6), a concave lens 11a, a convex lens 12a, a convex lens 13a, and a concave lens 14a, and an image pickup element 15a is disposed on an image plane. Similarly to the optical system (a), the optical systems (b), (c), and (d) include lenses 11b to 14b, 11c to 14c, and 11d to 14d, respectively, except for the orders of the concave lenses and convex lenses. Symbols Oa, Ob, Oc, and Od are optical axes of the optical systems (a) to (d), respectively. A light amount adjustment element 17 is disposed in front of four image pickup elements 15a to 15d. The light amount adjustment element 17 is an integrally-formed electroluminescence filter or the like. The plurality of optical systems (a) to (d) are disposed to be close to each other. Accordingly, it is preferred that an aperture stop or a light shielding wall (not illustrated) which limits an effective range of a ray is provided between the lenses and between the lens and the image pickup element so as to prevent unnecessary light from the adjacent optical system from reaching the corresponding image pickup element 15a to 15d. In FIG. 6, symbol F denotes a focus moving unit (focus lens), and it is capable of focusing (i.e., performing focus control) by using a drive mechanism (not illustrated) which integrally drives (moves) the focus moving unit F.

Figure 8A:
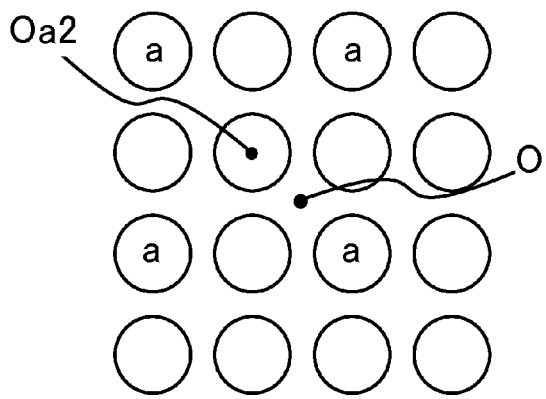
FIGS. 8A to 8D are diagrams of the arrangement of the plurality of optical systems in Embodiment 1.
Figure 8B:
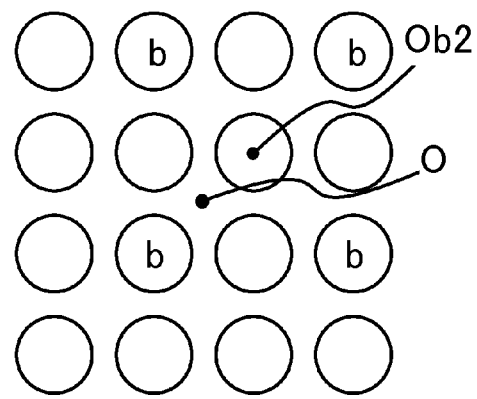
Figure 8C:
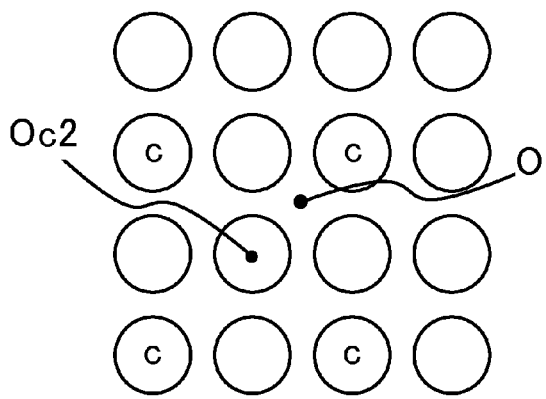
Figure 8D:
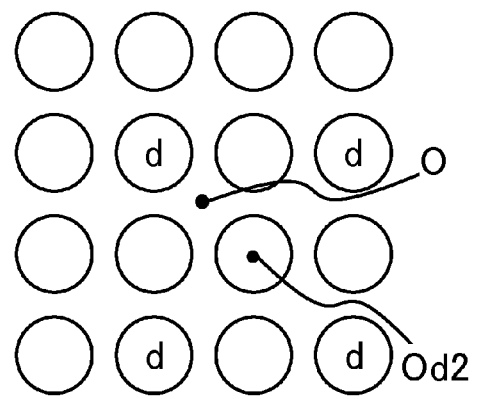

FIGS. 7 and 8A to 8D are diagrams of an arrangement of the plurality of optical systems in the lens unit 102. In FIGS. 7 and 8A to 8D, symbols "a" to "d" in respective circles denote, with respect to the 16 optical systems constituting the lens unit 102, optical systems each of which is constituted by a unit (group) having four focal lengths different from each other. A point O denotes a centroid (center) position of the 16 optical systems. As illustrated in FIG. 8A, the centroid position of the optical axes Oa of the four optical systems (a) is an optical-axis centroid Oa2. Similarly, with respect to the optical systems (b), (c), and (d), as illustrated in FIGS. 8B to 8D, the centroids of the optical axes Ob, Oc, and Od of the four optical systems (b), (c), and (d) are optical-axis centroids Ob2, Oc2, and Od2, respectively.

Figure 9:
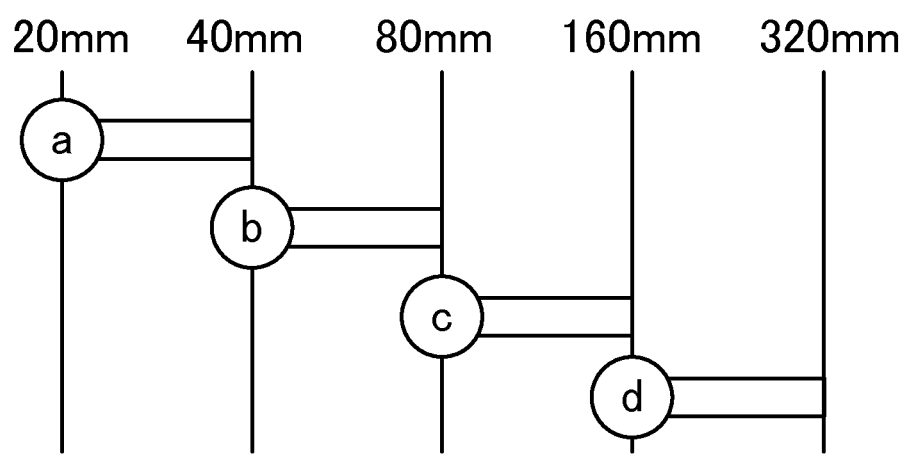
FIG. 9 is an explanatory diagram of electronic zooming in Embodiment 1.

Subsequently, referring to FIG. 9, a method of performing electronic zooming by using the optical systems (a) to (d) having the focal lengths different from each other will be described. FIG. 9 is an explanatory diagram of the electronic zooming. As illustrated in FIG. 9, the focal lengths of the optical systems (a) to (d) are set to 20 mm, 40 mm, 80 mm, and 160 mm, respectively. An image with a focal length 20 mm corresponding to a viewpoint O is reconstructed by using an image obtained via the four optical systems (a) illustrated in FIG. 8A. Thus, an image with another viewpoint O which is generated based on images with a plurality of viewpoints is called a free viewpoint image. That is, the free viewpoint image is an image with a predetermined viewpoint (viewpoint O) which is obtained from a plurality of images with a plurality of viewpoints (i.e., images with an identical angle of view and also with viewpoints different from each other). A method of generating the free viewpoint image will be described below, along with the compound eye image processing.

An image with a focal length from 20 mm to 40 mm can be generate by cutting (trimming) the image obtained via the optical system (a). It is preferred that an image interpolation is used to keep the number of pixels constant when cutting the image. Similarly, an image with a focal length from 40 mm to 80 mm, an image with a focal length from 80 mm to 160 mm, and an image with a focal length from 160 mm to 320 mm can be generated by cutting (trimming) the images obtained via the optical systems (b), (c), and (d), respectively. In this case, aligning the viewpoints (free viewpoints) of the images of respective focal lengths with the viewpoint O, a virtual optical axis during the electronic zooming is fixed. As described above, the free viewpoint is set to be the same position with respect to each focal length to fix the optical axis during the zooming.

Figure 10:
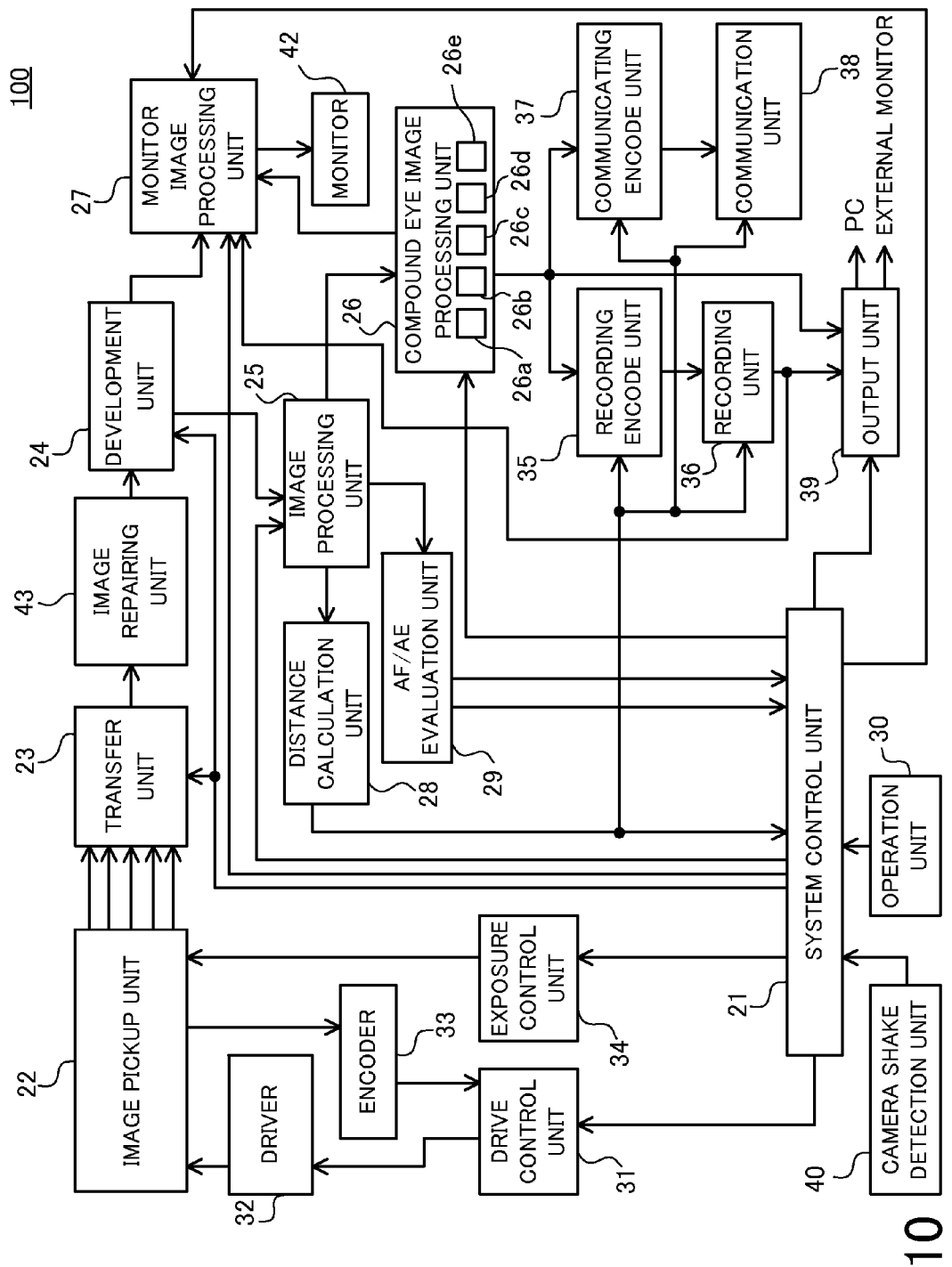
FIG. 10 is a block diagram of an image pickup apparatus in Embodiment 1.

Next, referring to FIG. 10, an internal configuration of the image pickup apparatus 100 in this embodiment will be described. FIG. 10 is a block diagram of the image pickup apparatus 100. In FIG. 10, reference numeral 21 denotes a system control unit which controls a shooting operation, reference numeral 22 denotes an image pickup unit, reference numeral 23 denotes a transfer unit, reference numeral 43 denotes an image repairing unit, reference numeral 24 denotes a development unit, and reference numeral 25 denotes an image processing unit. Reference numeral 26 denotes a compound eye image processing unit, and it corresponds to an image processing apparatus in this embodiment. The compound eye image processing unit 26 includes an image acquisition unit 26a, an image capturing condition acquisition unit 26b, an optical characteristic acquisition unit 26c, a correction unit 26d, and an image processing unit 26e. Reference numeral 27 denotes a monitor image processing unit, reference numeral 28 denotes a distance calculation unit, and reference 29 denotes an AF/AE evaluation unit. Reference numeral 30 denotes an operation unit to be operated by a user instructing a shooting, reference numeral 31 denotes a drive control unit, reference numeral 32 denotes a driver, reference numeral 33 denotes an encoder, reference numeral 34 denotes an exposure control unit, reference numeral 35 denotes a recording encode unit, reference numeral 36 denotes a recording unit, reference numeral 37 denotes a communicating encode unit, reference numeral 38 denotes a communication unit, and reference numeral 39 denotes an output unit. Reference numeral 40 denotes a camera shake detection unit and reference numeral 42 denotes a monitor. Hereinafter, functions of respective parts will be described.

(Shooting)

The system control unit 21 includes a CPU and a ROM (not illustrated) which stores a control program to be executed by the CPU, and it controls entire processing of the camera (image pickup apparatus 100). The operation unit 30 includes input devices such as a key and a button to be used by a user to give a desired instruction to the camera. In accordance with the operation of these input devices, the system control unit 21 supplies, to the monitor 42, data to display a mode transfer of the image pickup apparatus 100, a menu screen, or various information. Thus, the monitor 42 displays the data supplied from the system control unit 21, along with a shot/playback image. The shooting of the image is performed (i.e., the image is captured) based on a shooting instruction via the operation unit 30 by the user. When the shooting instruction is given, the system control unit 21 sends a shooting instruction signal to the image pickup unit 22.

Figure 11:
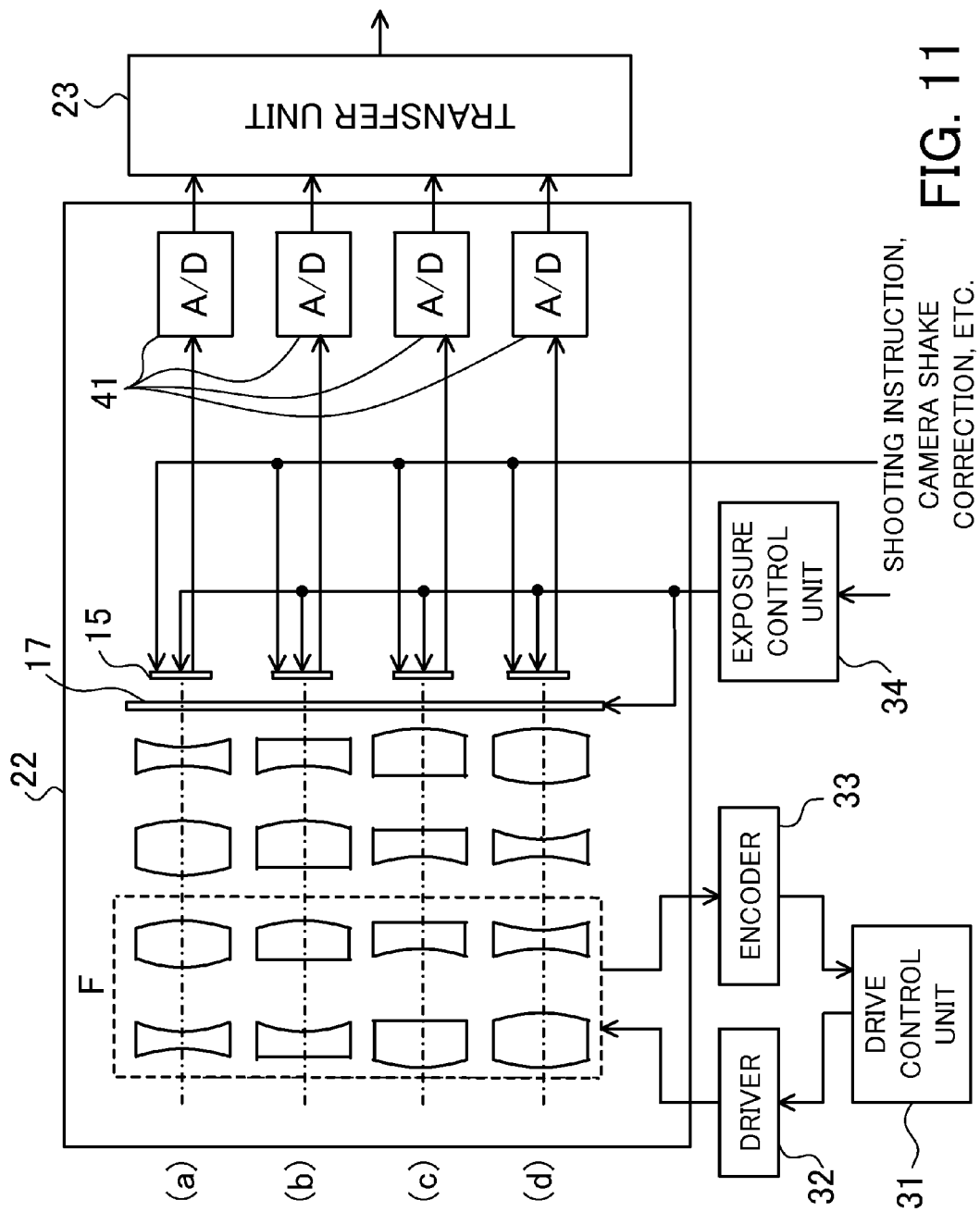
FIG. 11 is a block diagram of an image pickup unit in Embodiment 1.

Subsequently, referring to FIG. 11, the configuration of the operation of the image pickup unit 22 will be described in detail. FIG. 11 is a block diagram of the image pickup unit 22. The image pickup unit 22 includes the optical systems (a) to (d) illustrated in FIG. 6, the light amount adjustment element 17, the image pickup element 15 (image pickup elements 15a to 15d) provided corresponding to the respective optical systems, and an A/D converter 41. The shooting instruction signal from the system control unit 21 is sent to the image pickup element 15 (each of the image pickup elements 15a to 15d). The image pickup element 15 performs exposure in a predetermined period of time to generate charges by photoelectric conversion. The image pickup element 15 is for example a CMOS image sensor, which reads out an image pickup signal (analog signal) at a predetermined readout timing by a rolling shutter method. The A/D converter 41 converts the analog signal read from the image pickup element 15 to a digital data row (digital signal), and then supplies the digital signal to the transfer unit 23.

With respect to the image pickup signal (digital signal) from the plurality of optical systems (a) to (d), the transfer unit 23 appropriately adjusts the order and the timing of the output of data of the image pickup signal depending on the configuration of a processor such as the development unit 24 and the image processing unit 25 to perform processing at the latter stages. The image repairing unit 43 performs image processing to repair (or reduce) a noise or defect for each pixel, and then it supplies data as so-called RAW data to the development unit 24. The development unit 24 performs color interpolation processing for each pixel to generate an image signal, and it supplies a digital image pickup signal within a predetermined dynamic range to the image processing unit 25. In the color interpolation processing, the development unit 24 performs color decode processing so that RGB information is allocated to all pixels corresponding to respective color filter structures of the image pickup elements 15a to 15d (image sensor).

When the shutter of the operation unit 30 is pressed, the system control unit 21 outputs an instruction of the image processing to the image processing unit 25. Then, the image processing unit 25 performs the image processing such as white balance correction, gamma correction, sharpness correction, and chroma correction.

(Compound Eye Image Processing)

The compound eye image processing unit 26 (image processing apparatus) generates an RGB image (reconstructed image signal) shot with a virtual optical axis of a shot angle of view instructed by a user via the operation unit 30 (zoom lever 105 in FIG. 1). The virtual optical axis means an optical axis which is determined when a virtual lens system is set at the centroid O of the viewpoint illustrated in FIG. 7. In this embodiment, the compound eye image processing unit 26 generates the image signal (reconstructed image signal) in which the viewpoint is moved (corrected) to the virtual optical axis O based on images with four viewpoints. When the shot angle of view designated by the user is different from the focal lengths of the optical systems (a) to (d), the compound eye image processing unit 26 performs electronic zooming to cut out an area corresponding to the designated angle of view from the reconstructed image signal shot via the optical system with the focal length one step wider (with one step wider angle) than the designated angle of view.

Figure 12:
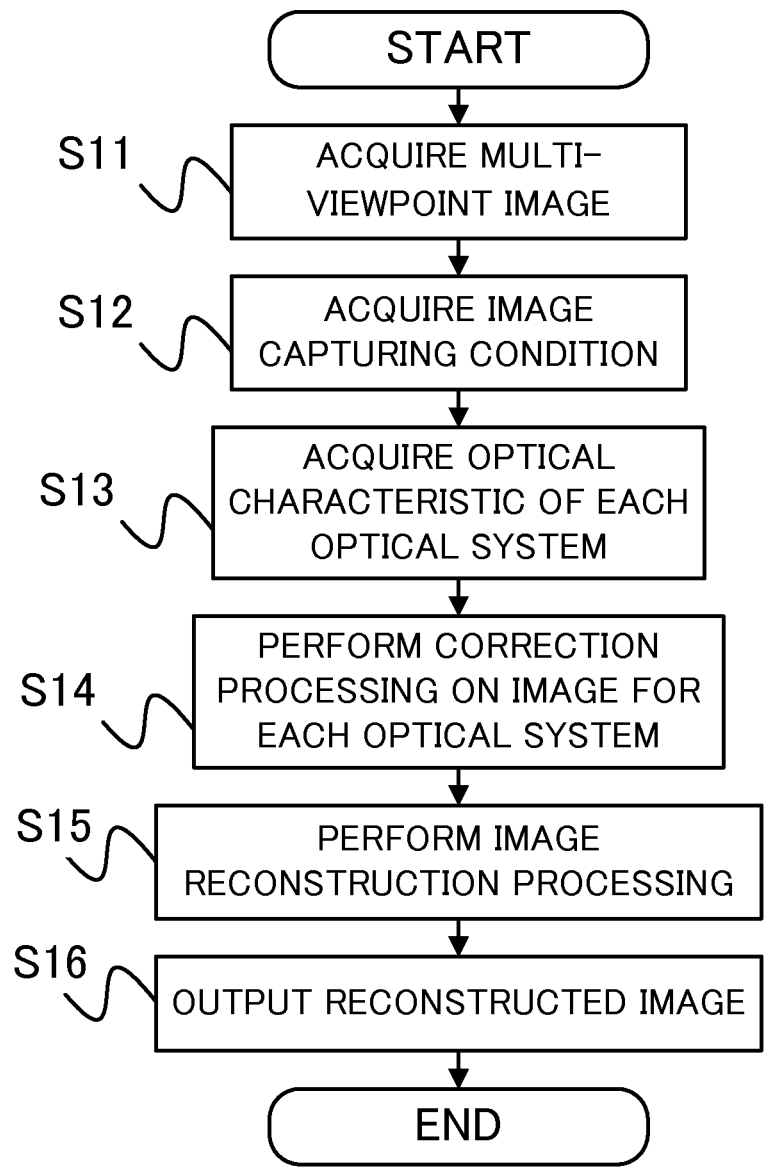
FIG. 12 is a flowchart of a compound eye image processing in Embodiment 1.

Next, referring to FIG. 12, an image processing method (compound eye image processing) performed by the compound eye image processing unit 26 will be described. FIG. 12 is a flowchart of the compound eye image processing. Each step in FIG. 12 is performed mainly by the compound eye image processing unit 26 based on an instruction of the system control unit 21.

First, at step S11, the compound eye image processing unit 26 (image acquisition unit 26a) acquires a multi-viewpoint image (first image). Subsequently, at step S12, the compound eye image processing unit 26 (image capturing condition acquisition unit 26b) acquires an image capturing condition (image capturing condition information) of the image pickup apparatus 100. The image capturing condition is for example a zoom position, an aperture value (F number), and a shooting distance. When the image pickup apparatus 100 does not include for example an aperture stop which is not provided with a variable opening, the aperture value may be omitted from the image capturing condition. The compound eye image processing unit 26 can acquire the image capturing condition from information added to the multi-viewpoint image acquired at step S11. Alternatively, the compound eye image processing unit 26 may acquire the image capturing condition directly from the image pickup apparatus 100 (system control unit 21). In this case, the compound eye image processing unit 26 only has to perform the processing at step S11 before starting step S14.

Subsequently, at step S13, the compound eye image processing unit 26 (optical characteristic acquisition unit 26c) acquires a previously-stored optical characteristic (optical characteristic information) for each of the plurality of optical systems (a) to (d). The optical characteristic means a characteristic related to an aberration of the optical system, and it includes at least one of a chromatic aberration of magnification (chromatic aberration of magnification correction information), a distortion (distortion correction information), an optical transfer function, and an image restoration filter generated based on the optical transfer function. The compound eye image processing unit 26 is capable of acquiring a motion blur locus (motion blur information such as a motion blur function) of the image pickup apparatus 100 during the exposure by using the camera shake detection unit 40 including a gyro sensor or the like. The optical characteristic can includes the motion blur function or a motion blur correction filter generated based on the motion blur function to correct a motion blur. The compound eye image processing unit 26 treats, as a PSF, the motion blur locus which occurs according to the shooting of the image pickup apparatus 100 held by hand or the like, and thus the image restoration processing can be applied. The optical characteristic may further include characteristics of a peripheral illumination (peripheral illumination correction information). Data related to the optical characteristic (optical characteristic information) can be selected among from data previously stored in the image pickup apparatus 100, and the previously-stored data may be corrected depending on the image capturing condition. The optical characteristic such as a motion blur can be acquired when shooting an image.

Subsequently, at step S14, the compound eye image processing unit 26 (correction unit 26d) performs correction processing on the image (first image) shot via each optical system by using the optical characteristic acquired at step S13. The correction processing includes chromatic aberration of magnification correction processing which corrects a difference of the shot magnification between RGB, distortion correction processing which corrects distortion of an image, image restoration processing which corrects a deterioration by the optical transfer function, and the like. The correction processing may include peripheral illumination correction processing which corrects a shortage of a light amount at the periphery of an image. Subsequently, at step S15, the compound eye image processing unit 26 (image processing unit 26e) performs image reconstruction processing on the multi-viewpoint image in which the decrease of an optical image quality is corrected (i.e., corrected first image). Then, at step S16, the compound eye image processing unit 26 outputs a reconstructed image (second image).

In order to reduce the load of the processing, it is preferred that the acquisition of the optical characteristic at step S13 and the correction processing at step S14 are performed only on an image necessary for the reconstruction processing of the output image. For example, in FIG. 9, since an image obtained via the optical system (c) may be used in order to output an image with a focal length of 100 mm, the correction processing only has to be performed on the image obtained via the four optical systems (c) in FIG. 7. For images to be used for the reconstruction processing, a high-definition image which does not require the correction may be excluded from images to be corrected.

Figure 15:
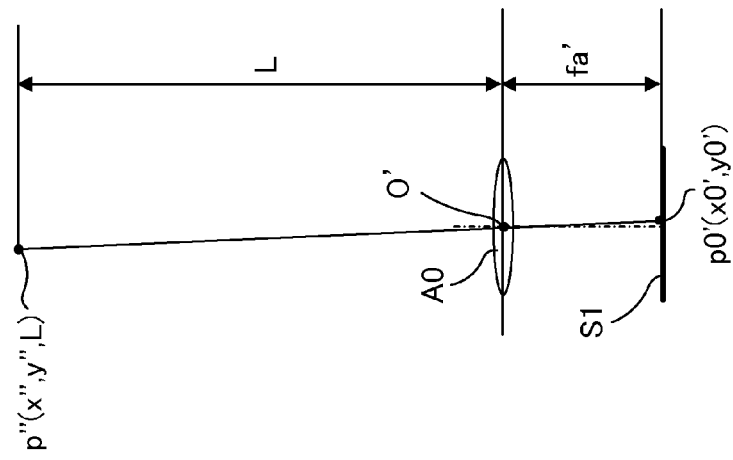
FIG. 15 is an explanatory diagram of the method of generating the reconstructed image in Embodiment 1.
Figure 14:
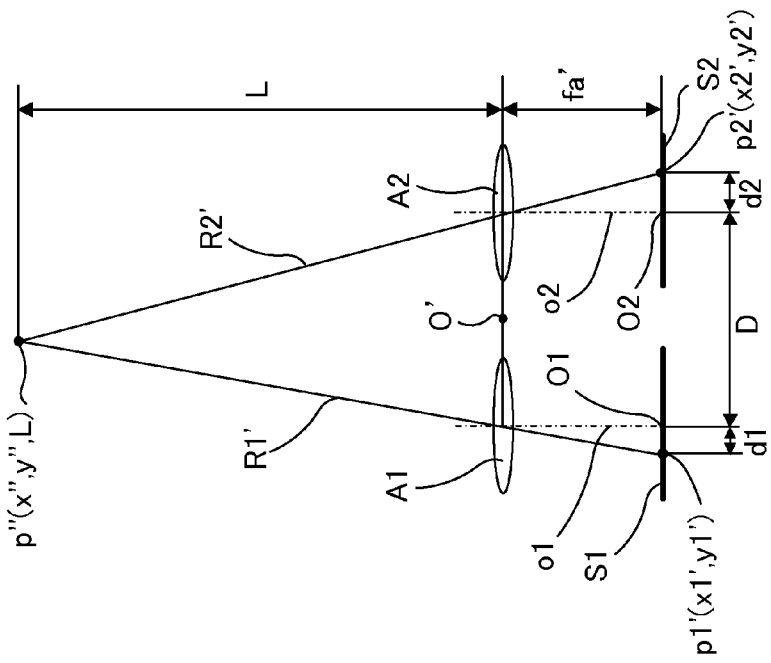
FIG. 14 is an explanatory diagram of the method of generating the reconstructed image in Embodiment 1.
Figure 13:
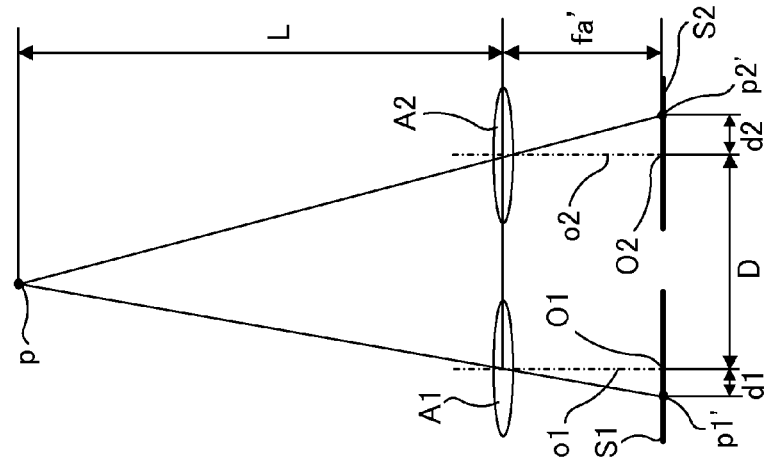
FIG. 13 is an explanatory diagram of a method of generating a reconstructed image in Embodiment 1.

Next, referring to FIGS. 13 to 15, a method of generating the reconstructed image (second image) by the compound eye image processing apparatus 26 will be described. FIGS. 13 to 15 are explanatory diagrams of the method of generating the reconstructed image.

In FIG. 13, as described above, an object p is imaged on image pickup elements S1 and S2 (corresponding points p1' and p2') via two lens systems A1 and A2 (optical systems), respectively, and it is read out as an image pickup signal. First, the system control unit 21 (compound eye image processing unit 26) extracts the corresponding points p1' and p2' from images generated via the lens systems A1 and A2, based on a correlation of a luminance signal distribution or a color signal distribution of the images.

Subsequently, the system control unit 21 (compound eye image processing unit 26) obtains a distance (object distance L) from a position of a principal point of each of the lens systems A1 and A2 to the object p by using the following expression (8). As illustrated in FIG. 14, p1'(x1',y1') and p2'(x2',y2') are coordinates with reference to origins of the images via the lens systems A1 and A2, respectively, L is the object distance, D is a gap between two optical axes o1 and o2, fa' is a distance from each of the principal points of the lens systems A1 and A2 to the respective image pickup element. Furthermore, d1 is a gap between the corresponding point p1' and an intersection O1 of the optical axis o1 and the image pickup element S1, and d2 is a gap between the corresponding point p2' and an intersection O2 of the optical axis o2 and the image pickup element S2. The system control unit 21 (compound eye image processing unit 26) uses these values to obtain a coordinate (x",y",L) of an object p" on computer with reference to an image pickup system origin O' (midpoint of the two lens systems A1 and A2 in FIG. 14).

$$L = \frac{D \cdot fa'}{d1 + d2} \quad (8)$$

In this embodiment, due to an error of the focal lengths of the lens systems A1 and A2 or a position shift between the lens systems A1 and A2 and the image pickup elements S1 and S2, reverse trace lines (straight lines R1' and R2') in FIG. 14 may not intersect with each other on a three-dimensional space on computer in some cases. In this case, a virtual flat plane is set at a position where the two straight lines R1' and R2' are closest, and a midpoint of this flat plane and the intersection of the straight lines may be obtained as a coordinate. When there are three or more lens systems, similar calculations can be performed by using straight lines obtained from respective lens systems.

Subsequently, an object p" on computer, obtained as illustrated in FIG. 15, is projected on a virtual image pickup element by using a lens system A0 with the focal length fa' virtually disposed at the image pickup optical system origin O', and a coordinate p0'(x0',y0') of a virtual image is obtained. The compound eye image processing unit 26 performs the image processing for an entire image to generate a reconstructed image with the virtual optical axis by using the virtual lens system A0.

The generation processing of the reconstructed image described above corresponds to generation of the reconstructed image (second image) based on information of positions and angles of rays obtained from the plurality of parallax images (first images).

(Monitor Display in Shooting)

Next, processing of displaying an image on the monitor 42 constituted by a thin unit such as a liquid crystal panel and an organic EL when the power of the image pickup apparatus 100 is turned on will be described. The monitor image processing unit 27 receives an output of the compound eye image processing unit 26, and it displays an image. Similarly to the compound eye image processing unit 26, the monitor image processing unit 27 simply performs correction processing of a viewpoint, and it generates a reconstructed image signal for display and sends it to the monitor 42. The monitor 42 displays the reconstructed image signal for display in real time. According to the simple display processing, the monitor image processing unit 27 can display a shot image on the monitor 42 while omitting image processing requiring much processing time such as image cutout processing, interpolation processing, and optical axis alignment processing. Therefore, a screen with a small amount of delay for display can be provided to a user. Accordingly, a convenient image pickup apparatus which does not interfere in the framing operation for an object or the like can be achieved. The correction processing by using the optical characteristic can be performed while making a choice appropriately in the simple display processing.

(Image Recording)

Figure 16:
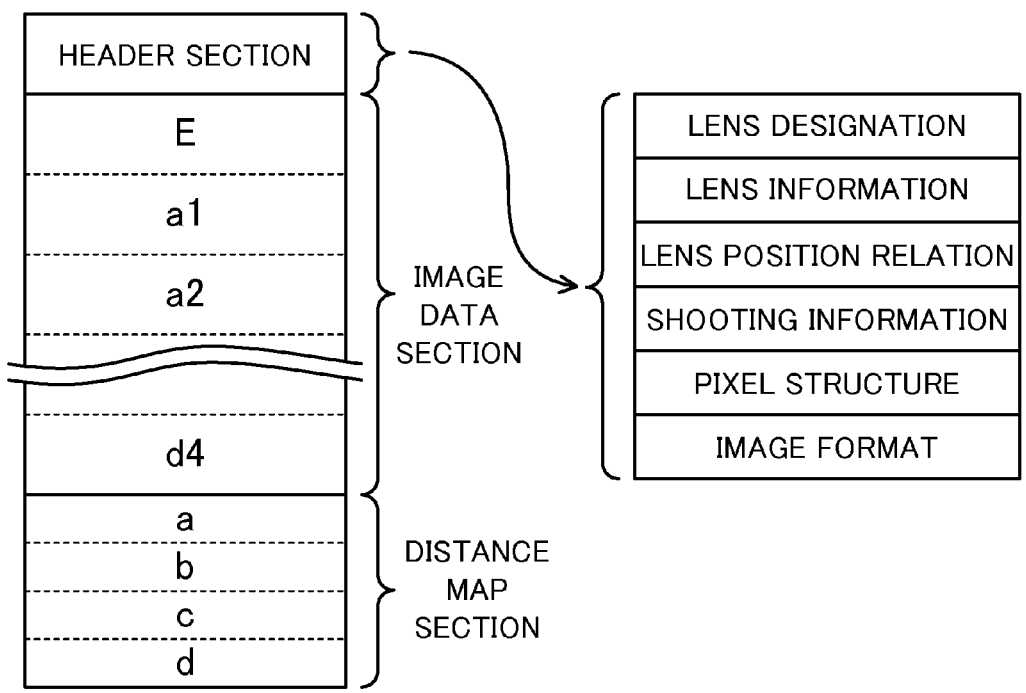
FIG. 16 is an explanatory diagram of an image format in Embodiment 1.

The recording encode unit 35 encodes the reconstructed image signal generated by the compound eye image processing unit 26 into a predetermined format as an example illustrated in FIG. 16. FIG. 16 is an explanatory diagram of an image format in this embodiment. The image format includes a header section of files to store shooting information, an image data section to store image data (image signals a1 to d4), and a distance map data section to store distance map data.

The header section includes "lens designation", "lens information", "lens position relation", "shooting information", "pixel structure", and "image format". The section of the "lens designation" stores information related to a type or structure of the lens system (optical system) provided in the image pickup apparatus 100. The section of the "lens information" stores angle of view information and optical characteristic information for each lens, and the like. The section of the "lens position relation" stores information of the position relation of the optical axis for each lens. Each of the "lens designation", the "lens information", and the "lens position relation" corresponds to a calculation coefficient. The section of the "shooting information" stores information of the angle of view when a user instructs shooting, information of latitude and longitude of a shooting location, information of time at the shooting location, and information of a direction of the image pickup apparatus 100 in the shooting. The section of the "pixel structure" stores information of the number of pixels in vertical and horizontal directions for recorded image data. The section of the "image format" stores information of a compression of an image and a type of the compression.

As image data, the reconstructed image signal generated with an angle of view instructed by the user is recorded, and subsequently, image data a1, a2, a3, and a4 shot via the optical systems (a) are recorded. Then, the image data with respect to the optical systems (b), (c), and (d) are recorded similarly. As distance map data, distance maps based on image signals (image data) shot via the optical systems (a) to (d) are sequentially recorded. The recording unit 36 records the reconstructed image signal encoded by the recording encode unit 35 in a recording medium such as a memory card (not illustrated).

Embodiment 2

Figure 17:
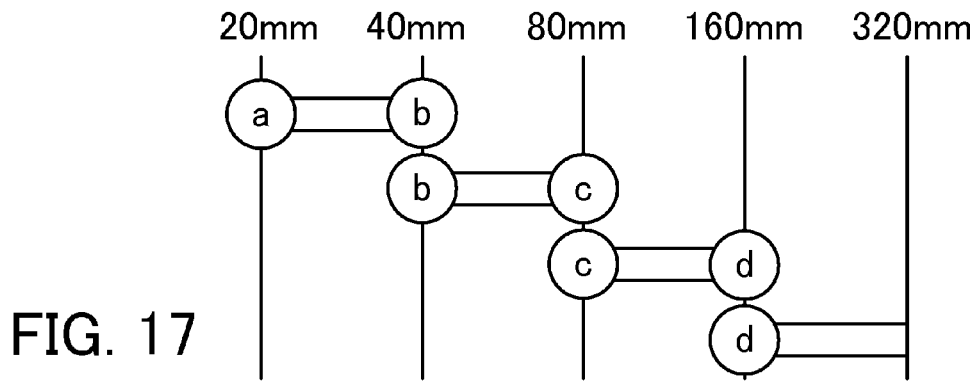
FIG. 17 is an explanatory diagram of electronic zooming in Embodiment 2.
Figure 18:
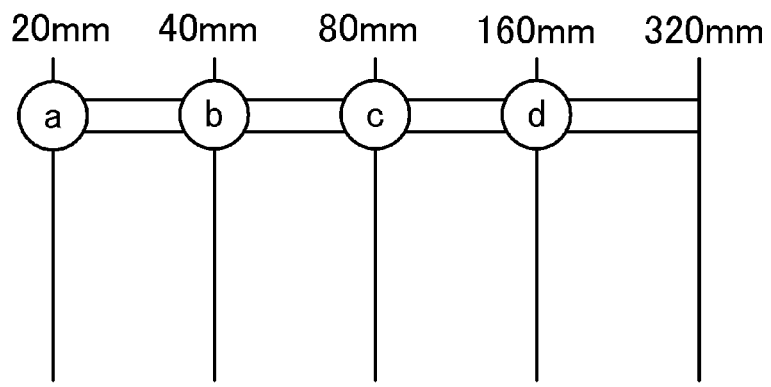
FIG. 18 is an explanatory diagram of the electronic zooming in Embodiment 2.
Figure 19:
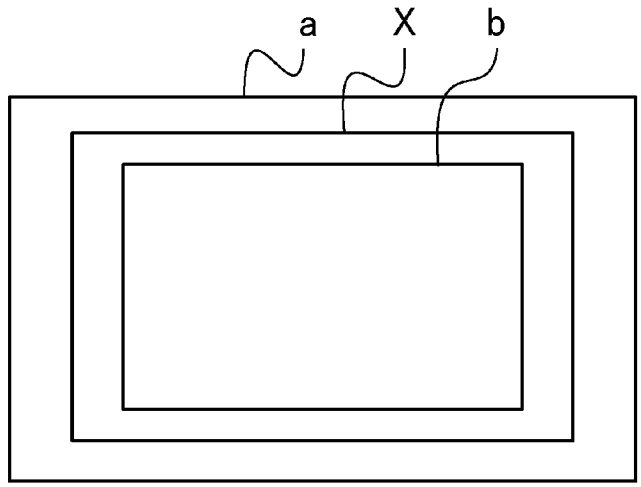
FIG. 19 is an explanatory diagram of an image synthesis during the electronic zooming in Embodiment 2.
Figure 20:
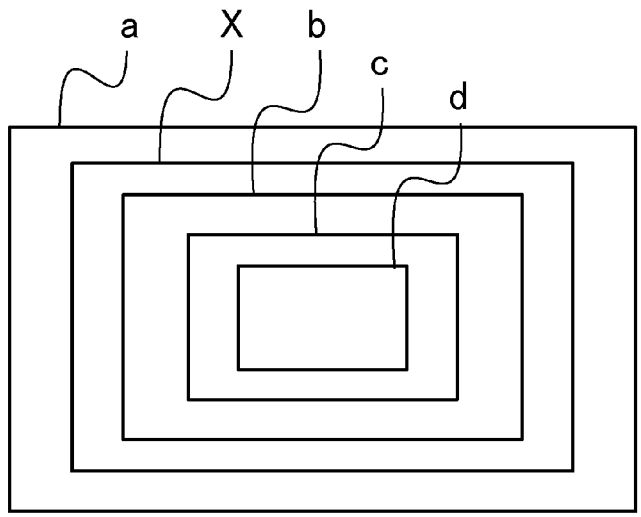
FIG. 20 is an explanatory diagram of the image synthesis during the electronic zooming in Embodiment 2.

Next, referring to FIGS. 17 to 20, compound eye image processing along with electronic zooming in Embodiment 2 of the present invention will be described. FIGS. 17 and 18 are explanatory diagrams of the electronic zooming in this embodiment. FIGS. 19 and 20 are explanatory diagrams of image synthesis processing during the electronic zooming in this embodiment. The basic configuration of an image pickup apparatus in this embodiment is the same as that of the image pickup apparatus 100 in Embodiment 1, and accordingly common descriptions are omitted.

In the compound eye image processing in Embodiment 1 described referring to FIG. 9, when an image pickup angle of view designated by a user is different from the focal lengths of the optical systems (a) to (d), the electronic zooming is performed for a reconstructed image shot by using an optical system having a focal length at a wide angle side at which the angle of view is wider by one step than the designated angle of view. On the other hand, in this embodiment, as illustrated in FIG. 17, when the designated image pickup angle of view is different from the focal lengths of the optical systems (a) to (d), the electronic zooming is performed for reconstructed images shot by using optical systems having focal lengths at a wide angle side and a telephoto side at which the angles of view are wider and narrower by one step respectively than the designated angle of view.

Symbols "a" and "b" in FIG. 19 denote images obtained via the optical systems (a) and (b), respectively. When the focal length designated by the user corresponds to an image X, the images "a" and "b" can be synthesized with respect to an area where the image "b" overlaps in the image X. On the other hand, with respect to an area where the image "b" does not overlap in the image X, the images "a" and "b" cannot be synthesized, and accordingly, only the image "a" is used. The same is true for a focal length between the optical systems (b) and (c) or between the optical systems (c) and (d).

As illustrated in FIG. 18, all or part of the images "a", "b", "c", and "d" can be selectively used when an image of for example a focal length between the optical systems (a) and (b) is generated. Accordingly, as illustrated in FIG. 20, high-resolution images (images "c" and "d") at the telephoto side compared to the image X can be synthesized. The correction processing of an image using the optical characteristics can be performed only for an image used to generate the image X having a focal length designated by the user to improve the speed of the processing.

Embodiment 3

Figure 21:
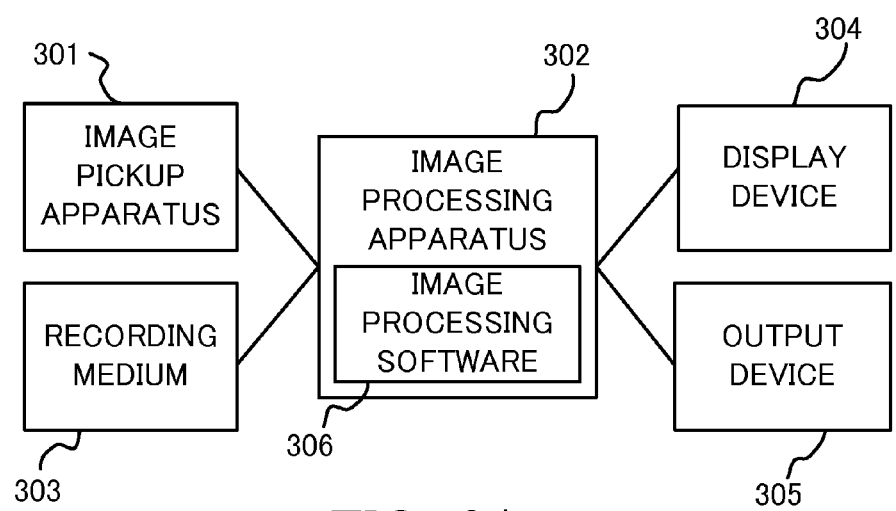
FIG. 21 is a block diagram of an image processing system in Embodiment 3.

Next, referring to FIG. 21, Embodiment 3 of the present invention will be described. This embodiment describes an image processing system which performs the image processing method described above. FIG. 21 is a block diagram of the image processing system in this embodiment. As illustrated in FIG. 21, the image processing system includes an image pickup apparatus 301. The image pickup apparatus 301 is, for example, a compound eye image pickup apparatus such as a camera, a microscope, an endoscope and a scanner, and it has a basic configuration similar to the image pickup apparatus 100 of Embodiment 1 described referring to FIG. 10. An image processing apparatus 302 is a computer device (information processing apparatus) which is capable of performing the image processing method of each embodiment described above. The image processing apparatus 302 has the same function as that of the compound eye image processing unit 26 (image acquisition unit 26*a*, image capturing condition acquisition unit 26*b*, optical characteristic acquisition unit 26*c*, correction unit 26*d*, and image processing unit 26*e*).

A recording medium 303 is for example a semiconductor memory, a hard disk, or a server on a network, and it stores a shot image. The image processing apparatus 302 acquires shot image data from the image pickup apparatus 301 or the recording medium 303, and then outputs the image data for which predetermined processing is performed to at least one of an output device 305, the image pickup apparatus 301, and the recording medium 303. Alternatively, the image data can be output to and stored in a storage unit included in the image processing apparatus 302. The output device 305 is for example a printer. A display device 304 (monitor 42) is connected to the image processing apparatus 302 to input a corrected image to the display device 304. The user can work while confirming the corrected image through the display device 304. Image processing software 306 (image processing program) executes the image processing method of each embodiment described above, along with development processing or other image processing as needed. The display device 304 is for example a liquid crystal display or a projector.

In this embodiment, it is preferred that data such as correction information to perform the image processing method and information related to the transmission and reception of the data between devices are accompanied by individual image data. Since necessary correction information is accompanied by the image data, the correction processing can be performed by any device which includes the image processing apparatus of this embodiment.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

The image processing method in each embodiment includes a step (step S11) of acquiring a first image shot by using a compound eye image pickup apparatus, a step (step S12) of acquiring image capturing condition information of the first image, and a step (step S13) of acquiring, depending on the image capturing condition information, optical characteristic information of a plurality of optical systems having a plurality of focal lengths different from each other in the compound eye image pickup apparatus. The image processing method further includes a step (step S14) of correcting the first image (i.e. correcting a deterioration of the first image caused by shooting the first image) based on the optical characteristic information, and a step (step S15) of generating a second image based on information of a position and an angle of a ray obtained from the corrected first image (i.e. the first image whose deterioration is corrected). The optical characteristic information contains at least one of information related to aberrations and information related to peripheral illumination of the optical systems.

Preferably, the focal lengths are fixed. The optical systems include a plurality of first optical systems (one of optical systems (a) to (d)) having a first focal length, and a plurality of second optical systems (another of the optical systems (a) to (d)) having a second focal length different from the first focal length. More preferably, the optical characteristic information contains at least one of chromatic aberration of magnification correction information, distortion correction information, and peripheral illumination correction information. Preferably, the optical characteristic information contains at least one of an optical transfer function and an image restoration filter generated based on the optical transfer function. Preferably, the optical characteristic information contains at least one of a motion blur function and a motion blur correction filter generated based on the motion blur function. Preferably, the optical characteristic information is different depending on the optical systems.

Preferably, the second image is generated by reconstruction processing on the first image whose deterioration is corrected (i.e. the corrected first image). More preferably, the second image is generated by electronic zooming after the reconstruction processing on the first image whose deterioration is corrected. Preferably, the focal lengths include a first focal length at a wide-angle side and a second focal length at a telephoto side. The second image is an image having an angle of view which corresponds to a third focal length between the first and second focal lengths. Preferably, the second image is generated by the electronic zooming after the reconstruction processing on the first image having an angle of view which corresponds to the first focal length. Preferably, the second image is generated by the electronic zooming and image synthesis processing after the reconstruction processing on the first image having an angle of view which corresponds to each of the first and second focal lengths.

Preferably, in the reconstruction processing on the first image whose deterioration is corrected, free viewpoint images related to the respective focal lengths are generated by using the first image whose deterioration is corrected. More preferably, the free viewpoint images related to the respective focal lengths have viewpoints which coincide with each other. In other words, the free viewpoints are set to an identical position with respect to each focal length to fix an optical axis during zooming. Preferably, the step of correcting the deterioration of the first image includes correcting a deterioration of a specific first image of the first images based on the optical characteristic information of a specific optical system of the optical systems.

The present invention can provide an image processing method capable of generating a high-definition image from a shot image obtained via a plurality of optical systems having a plurality of focal lengths different from each other, an image processing apparatus, an image pickup apparatus, and a non-transitory computer-readable storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-157545, filed on Aug. 1, 2014, which is hereby incorporated by reference wherein in its entirety.

What is claimed is:

1. An image processing method comprising:
acquiring a first image shot by using a compound eye image pickup apparatus;
acquiring image capturing condition information of the first image;
acquiring, in view of the image capturing condition information, optical characteristic information of a plurality of optical systems having a plurality of focal lengths different from each other in the compound eye image pickup apparatus;
correcting a deterioration of the first image caused by shooting the first image based on the optical characteristic information; and
generating a second image based on information of a position and an angle of a ray obtained from the deterioration-corrected first image, the second image being different from the deterioration-corrected first image,
wherein the optical characteristic information contains at least one of information related to aberrations of the optical systems and information related to peripheral illumination of the optical systems.

2. The image processing method according to claim 1, wherein the focal lengths are fixed, and
wherein the optical systems include:
a plurality of first optical systems having a first focal length, and
a plurality of second optical systems having a second focal length different from the first focal length.

3. The image processing method according to claim 1, wherein the optical characteristic information contains at least one of chromatic aberration of magnification correction information, distortion correction information, and peripheral illumination correction information.

4. The image processing method according to claim 1, wherein the optical characteristic information contains at least one of an optical transfer function and an image restoration filter generated based on the optical transfer function.

5. The image processing method according to claim 1, wherein the optical characteristic information is different depending on the optical systems.

6. The image processing method according to claim 1, wherein the second image is generated by reconstruction processing on the deterioration-corrected first image.

7. The image processing method according to claim 6,
wherein the second image is generated by electronic zooming after the reconstruction processing on the deterioration-corrected first image.

8. The image processing method according to claim 7,
wherein the focal lengths include a first focal length at a wide-angle side and a second focal length at a telephoto side, and
wherein the second image is an image having an angle of view which corresponds to a third focal length between the first and second focal lengths.

9. The image processing method according to claim 8,
wherein the second image is generated by the electronic zooming after the reconstruction processing on the first image having an angle of view which corresponds to the first focal length.

10. The image processing method according to claim 8,
wherein the second image is generated by the electronic zooming and image synthesis processing after the reconstruction processing on the first image having an angle of view which corresponds to each of the first and second focal lengths.

11. The image processing method according to claim 6,
wherein in the reconstruction processing on the deterioration-corrected first image, free viewpoint images related to the respective focal lengths are generated by using the deterioration-corrected first image.

12. The image processing method according to claim 11,
wherein the free viewpoint images related to the respective focal lengths have viewpoints which coincide with each other.

13. The image processing method according to claim 1,
wherein correcting the deterioration of the first image includes correcting a deterioration of a specific first image of the first images based on the optical characteristic information of a specific optical system of the optical systems.

14. An image processing apparatus comprising:
one or more processors; and
a memory storing instructions which, when executed by the one or more processors, cause the image processing apparatus to function as:
an image acquisition unit configured to acquire a first image shot by using a compound eye image pickup apparatus;
an image capturing condition acquisition unit configured to acquire image capturing condition information of the first image;
an optical characteristic acquisition unit configured to acquire, in view of the image capturing condition information, optical characteristic information of a plurality of optical systems having a plurality of focal lengths different from each other in the compound eye image pickup apparatus;
a correction unit configured to correct a deterioration of the first image caused by shooting the first image based on the optical characteristic information; and
an image processing unit configured to generate a second image based on information of a position and an angle of a ray obtained from the deterioration-corrected first image, the second image being different from the deterioration-corrected first image,
wherein the optical characteristic information contains at least one of information related to aberrations of the optical systems and information related to peripheral illumination of the optical systems.

15. An image pickup apparatus comprising:
a plurality of optical systems having a plurality of focal lengths different from each other;
a plurality of image pickup elements provided corresponding to the respective optical systems;
one or more processors; and
a memory storing instructions which, when executed by the one or more processors, cause the image processing apparatus to function as:
an image acquisition unit configured to acquire a first image shot by using the optical systems and the image pickup elements;
an image capturing condition acquisition unit configured to acquire image capturing condition information of the first image;
an optical characteristic acquisition unit configured to acquire, in view of the image capturing condition information, optical characteristic information of the optical systems;
a correction unit configured to correct a deterioration of the first image caused by shooting the first image based on the optical characteristic information; and
an image processing unit configured to generate a second image based on information of a position and an angle of a ray obtained from the deterioration-corrected first image, the second image being different from the deterioration-corrected first image,
wherein the optical characteristic information contains at least one of information related to aberrations of the optical systems and information related to peripheral illumination of the optical systems.

16. A non-transitory computer-readable storage medium storing an image processing program which causes a computer to execute a process comprising:
acquiring a first image shot by using a compound eye image pickup apparatus;
acquiring image capturing condition information of the first image;
acquiring, in view of the image capturing condition information, optical characteristic information of a plurality of optical systems having a plurality of focal lengths different from each other in the compound eye image pickup apparatus;
correcting a deterioration of the first image caused by shooting the first image based on the optical characteristic information; and
generating a second image based on information of a position and an angle of a ray obtained from the deterioration-corrected first image, the second image being different from the deterioration-corrected first image,
wherein the optical characteristic information contains at least one of information related to aberrations of the optical systems and information related to peripheral illumination of the optical systems.

* * * * *